United States Patent [19]

Stjerna

[11] 4,360,084
[45] Nov. 23, 1982

[54] BLOCK BRAKE ASSEMBLY FOR THE WHEEL OF A RAILWAY VEHICLE

[75] Inventor: Sven Stjerna, Vasteras, Sweden

[73] Assignee: ASEA Aktiebolag, Vasteras, Sweden

[21] Appl. No.: 181,726

[22] Filed: Aug. 27, 1980

[30] Foreign Application Priority Data

Sep. 21, 1979 [SE] Sweden .............................. 7907641

[51] Int. Cl.³ ............................................. F16D 65/04
[52] U.S. Cl. .................................... 188/242; 188/243
[58] Field of Search ............... 188/234, 235, 242, 243, 188/246, 247, 248, 250 F, 250 G

[56] References Cited

U.S. PATENT DOCUMENTS

| 277,360 | 5/1883 | Siqueira | 188/234 |
| 346,825 | 8/1886 | Poor | 188/235 |
| 739,605 | 9/1903 | Jones | 188/235 |
| 1,444,462 | 2/1923 | Huffman | 188/243 |
| 2,050,384 | 8/1936 | Schaefer | 188/243 |
| 3,124,221 | 3/1964 | Prentice | 188/243 |

FOREIGN PATENT DOCUMENTS

| 1054480 | 4/1959 | Fed. Rep. of Germany | 188/246 |
| 2128562 | 12/1972 | Fed. Rep. of Germany | 188/242 |
| 11792 | of 1907 | United Kingdom | 188/242 |

Primary Examiner—Edward R. Kazenske
Attorney, Agent, or Firm—Watson, Cole, Grindle & Watson

[57] ABSTRACT

A block brake assembly for a railway vehicle includes a holder for one or more brake blocks which, when the brake is engaged, are pressed against the periphery of the vehicle wheel. The holder comprises a pair of spaced side members, and the brake block or blocks have guide lugs and attaching lugs thereon projecting between the members. The blocks are retained against the holder by a leaf spring which is pivotally mounted at one end to the holder, projects through openings in the attaching lugs and bears against a lock pin on the holder at an opposite end thereof. A pair of stop elements on the holder bear against outer sides of a pair of the lugs for preventing tangential displacement of the block brake or brakes relative to the side members.

1 Claim, 4 Drawing Figures

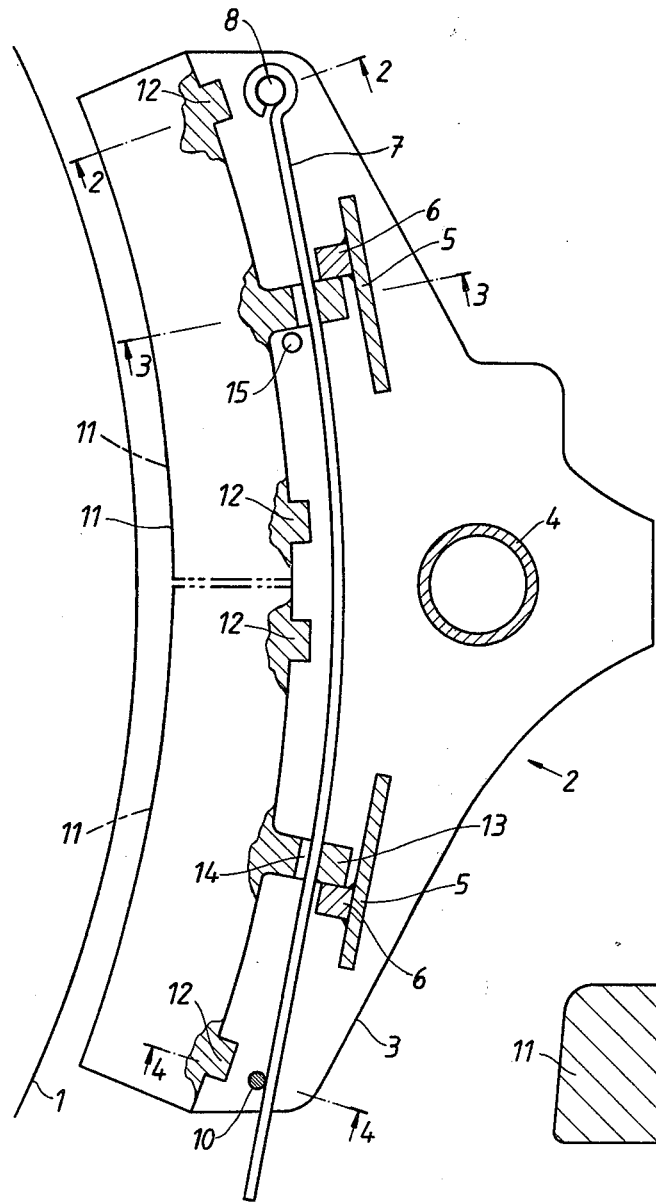
FIG. 1
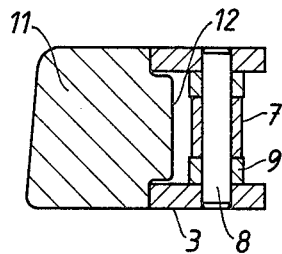
FIG. 2
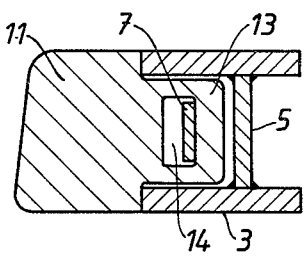
FIG. 3
FIG. 4

BLOCK BRAKE ASSEMBLY FOR THE WHEEL OF A RAILWAY VEHICLE

BACKGROUND OF THE INVENTION

This invention relates to a block brake assembly for a railway vehicle, the assembly having one, but usually two or more, exchangeable brake blocks in a holder which is mounted for pivotal movement about an axis parallel to the axle of the braked wheel. The assembly is displaceable against the wheel so that the brake block is pressed against the periphery thereof when the brake is engaged.

SUMMARY OF THE INVENTION

It is a principle objective of the present invention to provide a brake block assembly for a wheel of a railway vehicle in such a manner as to facilitate quick and easy replacement of worn brake blocks.

In accordance with the invention, the holder comprises a pair of spaced side members, and the brake blocks have guide lugs and attaching lugs thereon projecting between the members. A leaf spring is pivotally mounted at one end of the block holder, extends through openings in the attaching lugs and bears against a lock pin at the other end of the block holder for retaining the brake blocks in place against the side members. Stop elements are provided on the holder for bearing against the attaching lugs or the guide lugs for preventing tangential displacement of the blocks relative to the holder.

Other objects, advantages and novel features of the invention will become more apparent from the following detailed description of the invention when taken in conjunction with the accompanying drawings.

BRIEF DESCRIPTION OF THE DRAWINGS

FIG. 1 is a sectional view taken through a brake block holder assembly according to the invention and shown relative to the contour of a wheel to be braked; and FIG. 2, 3, and 4 are sectional views taken substantially along lines 2—2, 3—3, and 4—4 of FIG. 1, respectively.

DETAILED DESCRIPTION OF THE INVENTION

Turning now to the drawings wherein like reference characters refer like and corresponding parts throughout the several views, the contour of a railway wheel to be braked is generally designated 1 in FIG. 1. The brake block holder assembly 2 according to the invention comprises a pair of spaced side members 3, a bearing tube 4, and a pair of plates 5 interconnecting side members 3 together. Stop elements 6 are mounted on plates 5, and a leaf spring 7 is pivotally mounted at one end to a pin 8 extending between the side members of the holder at one end thereof. Rings 9 (see FIG. 2) position the leaf spring in a lateral direction. The other end of the leaf spring bears against a lock pin 10 extending between side members 3 as shown in FIG. 4.

Holder 2 is adapted for retaining a single brake block 11 or a pair of brake blocks 11 lying end-to-end shown by the pair of phantom lines at the center of the assembly. Each pair of brake blocks is provided with a pair of guide lugs 12 projecting between side members 3 as shown in FIGS. 2 and 4. Each pair brake blocks is further provided with an attaching lug 13 which likewise projects between members 3 (FIG. 3), each attaching lug having a transverse opening 14 through which leaf spring 7 extends. And, attaching lugs 13 of the brake blocks are located between stop elements 6 which bear against outer sides of the attaching lugs for limiting tangential movement of blocks 11 within the holder relative to side members 3. With such an arrangement, the leaf spring serves to retain the bearing blocks against side members 3 (as shown in FIG. 2 to 4) as lock pin 10 bears against the opposite end of the leaf spring. Thus, since the brake block assembly is pivotable about an axis parallel to the axle of wheel 1 to be braked, the side members of the holder are displaced toward the wheel so that the brake blocks are pressed against the periphery of the wheel when the brake is engaged. The braking power is therefore transmitted from blocks 11 by the friction between the brake blocks and side members 3. Any braking power which is not transmitted by such friction is taken up by stop element 6.

Replacement of a worn brake block or blocks may be easily and quickly carried out by removing lock pin 10 so that spring 7 together with the brake blocks may be swung outwardly against wheel 1 for releasing attaching lugs 13 from stop elements 6 to facilitate removal of the worn blocks. A first replacement brake block 11 may then be inserted by moving it along spring 11 until it is locked in place against tangential movement by a locking pin which extends through a hole 15 provided in one or both of side members 3. The other block 11 may then move along the leaf spring which extends through its opening 14 in attaching lug 13, after which the spring is moved away from the wheel 1 until lock pin 10 is again fixed in place between the side members 3. The replacement brake blocks are thus assembled in place and are positively retained against side members 3 by the leaf spring.

Obviously, many modifications and variations of the present invention are made possible in the light of the above teaching. It is therefore to be understood that within the scope of the appended claims the invention may be practiced otherwise than as specifically described.

What is claimed is:

1. In a brake block assembly for a wheel of a railway vehicle, including a holder having at least one replaceable brake block, the assembly being pivotable about an axis parallel to the wheel axle and being displaceable toward the wheel so that the brake block is pressed against the periphery of the wheel when the brake is engaged, the improvement wherein said holder comprises a pair of spaced side members, said brake block having guide lugs and attaching lugs thereon projecting between said members, a leaf spring disposed between said members and being pivotably mounted at one end to said members, said attaching lugs having transverse openings therein and said spring extending through said openings for retaining said block against said holder and for pivoting said block away from and toward said holder during removal and replacement of said block, a removable lock pin on said side members bearing against an opposite end of said spring for locking said brake block against said side members, a pair of stop elements mounted between said side members and bearing against outer sides of a pair of said lugs for preventing tangential displacement of said block brake relative to said side members.

* * * * *